MEANS FOR CONVERTING A SYNCHRO SHAFT ANGLE
TO A LINEAR DIRECT CURRENT SIGNAL

Filed Dec. 31, 1964 2 Sheets-Sheet 1

INVENTORS
ROBERT J. MOLNAR
WALTER PARFOMAK
BY Constantine A. Michalos
ATTORNEY

INVENTORS
ROBERT J. MOLNAR
WALTER PARFOMAK
BY
Constantine A. Michalos
ATTORNEY

United States Patent Office 3,375,508
Patented Mar. 26, 1968

3,375,508
MEANS FOR CONVERTING A SYNCHRO SHAFT ANGLE TO A LINEAR DIRECT CURRENT SIGNAL

Robert J. Molnar, New York, and Walter Parfomak, Brooklyn, N.Y., assignors to The Bendix Corporation, Teterboro, N.J., a corporation of Delaware Filed Dec. 31, 1964, Ser. No. 422,766
19 Claims. (Cl. 340—198)

ABSTRACT OF THE DISCLOSURE

A converter for converting two alternating current voltages phase separated in accordance with the angular position of a synchro shaft to a direct current output which varies linearly in accordance with the phase separation of the alternating current signals. The converter includes means for converting the alternating current signals to pulses time separated in accordance with the phase separation of the signals for controlling conduction of a silicon controlled rectifier in the interval between the pulses. A filter connected to the silicon controlled rectifier provides a direct current output which varies linearly with the phase separation of the alternating current signals.

This invention relates generally to electronic converters and more particularly to a solid state converter for converting an alternating current synchro signal to a direct current signal which varies linearly in accordance with rotation of the synchro rotor.

Heretofore, alternating current to direct current converters had many disadvantages in that they were not capable of achieving an accurate linear and temperature stable output, and, in addition, they required an excessive amount of electronic components to achieve the conversion, without producing stabilized accuracy.

The present invention provides a circuit which produces an accurate linear temperature stable direct current output by utilizing a synchro resolver and phase shift bridge to produce two sine waves which vary in phase in accordance with rotation of the transmitter shaft. The sine waves are squared by amplifiers and differentiated by resistor-capacitor circuits in order to produce two pulses. One pulse turns on a silicon controlled rectifier switch while the other pulse turns off the silicon controlled rectifier switch. The silicon controlled rectifier switch is used to produce an output pulse that varies linearly in width with the angular displacement of the transmitter shaft. The direct current content of the output pulses is extracted by a filter, as herein more fully described.

One object of the present invention is to provide a solid state precision converter for converting an alternating current synchro signal into a direct current temperature stable signal which varies linearly with angular displacement of the synchro shaft.

Another object of the invention is to provide a simple electronic converter for converting sensed alternating current signals into direct current signals for use in driving the display of an electroluminescent photoconductor system such as described in a copending U.S. application Ser. No. 535,745, filed Mar. 21, 1966, by Robert J. Molnar et al. and assigned to The Bendix Corporation, the same assignee as the assignee of the present application.

A further object of this invention is to provide a simple synchro signal to direct current converter by utilizing a phase shift bridge to produce turn-on and turn-off pulses.

Another object of the invention is to provide activating circuitry for silicon controlled rectifiers.

An additional object of this invention is to provide a novel synchro signal to direct current converter operable for stabilizing voltage amplitude of pulses by providing a buffer circuit and zener diodes between a filter stage and a switching stage.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figures 1, 2:
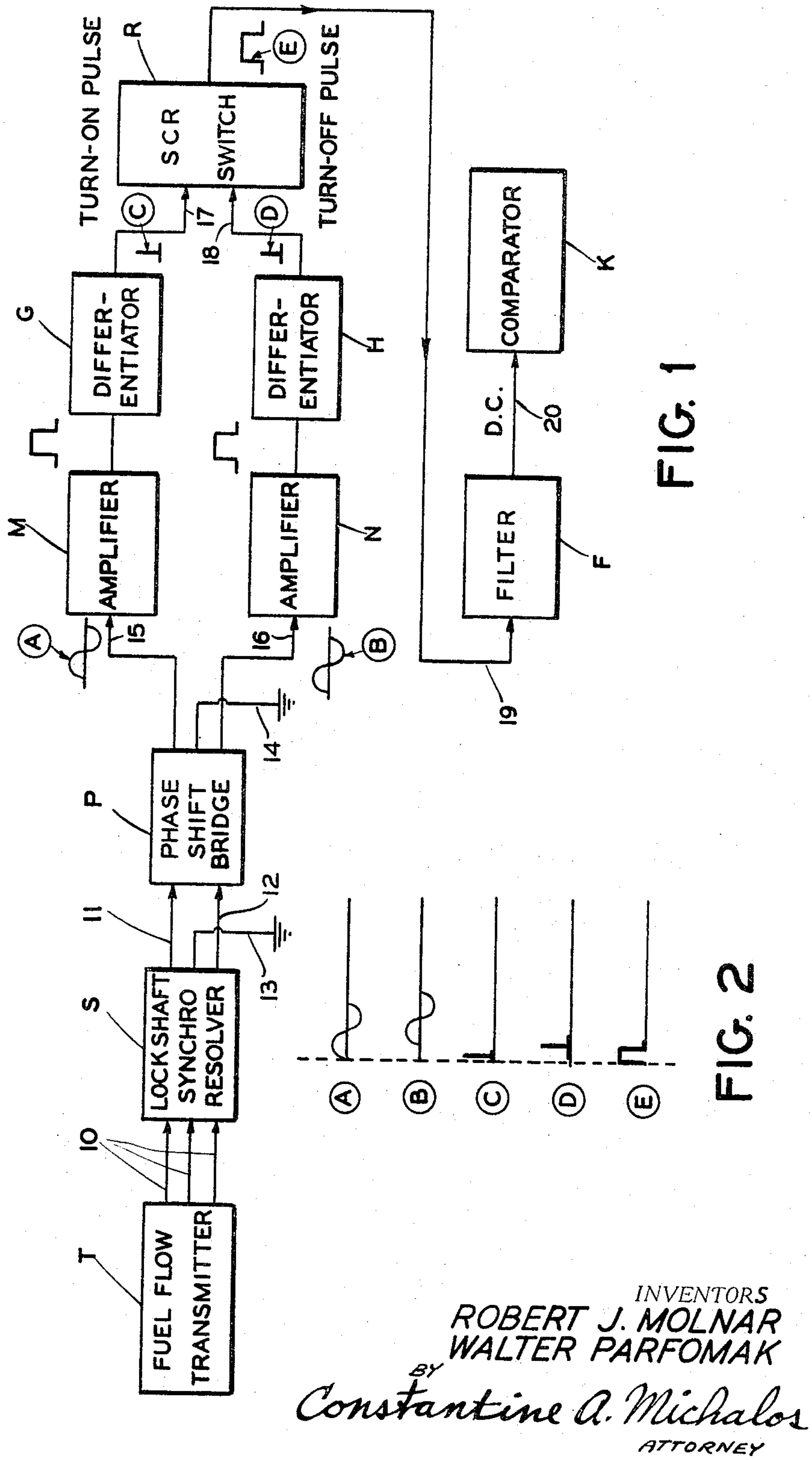
FIGURE 1 shows a block diagram of the synchro to direct current converter in accordance with a preferred embodiment of the invention.
FIGURE 2 is a graphical representation of the electrical signals in various stages of the block diagram circuitry shown in FIGURE 1.

As illustrated in the block diagram of FIGURE 1 of the drawing and in the graphical representation of FIGURE 2, the embodiment of this invention primarily provides for a three phase-two phase synchro resolver S connected to and receiving data from a fuel flow synchro transmitter T through conductors 10. The synchro shaft of the fuel flow transmitter T rotates in accordance with a measured parameter while the shaft of the synchro resolver S is locked.

The synchro resolver S is connected to a phase shift bridge P through conductors 11 and 12 to produce two sine waves A and B at conductors 15 and 16. The relative phase angles of sine waves A and B correspond to the synchro shaft angular position of fuel flow transmitter T. As shown, both the synchro resolver S and the phase shift bridge P are connected to ground by conductors 13 and 14 respectively.

Each of the two sine waves A and B are directed to amplifiers M and N when they are squared and the square waves are differentiated by the resistor-capacitor differentiator circuits G and H. The differentiators G and H produce output pulses C and D which are time separated in accordance with the phase separation of sine waves A and B to turn on and to turn off a silicon controlled rectifier switch R. As shown schematically in FIGURE 1, the differentiators G and H are connected by conductors 17 and 18 to the silicon controlled rectifier switch R. The output pulse C at differentiator G may turn on the silicon controlled rectifier switch R and the other output pulse D at differentiator H may turn off the silicon controlled rectifier switch R. In this manner, the silicon controlled rectifier switch R may produce a direct current output square pulse E that varies in width linearly with the angular position of the rotatable shaft of the fuel flow transmitter T.

The direct current output is then extracted by a filter F connected to the silicon controlled rectifier switch R through conductor 19. The direct current output may then be directed through a conductor 20 to be utilized by a system such as disclosed in detail in the aforementioned copending U.S. application Ser. No. 535,745.

The signal from the fuel flow transmitter T is graphically represented at different stages of its propagation through the solid state converter circuitry which converts the initial alternating current signal to direct current.

Figure 3:
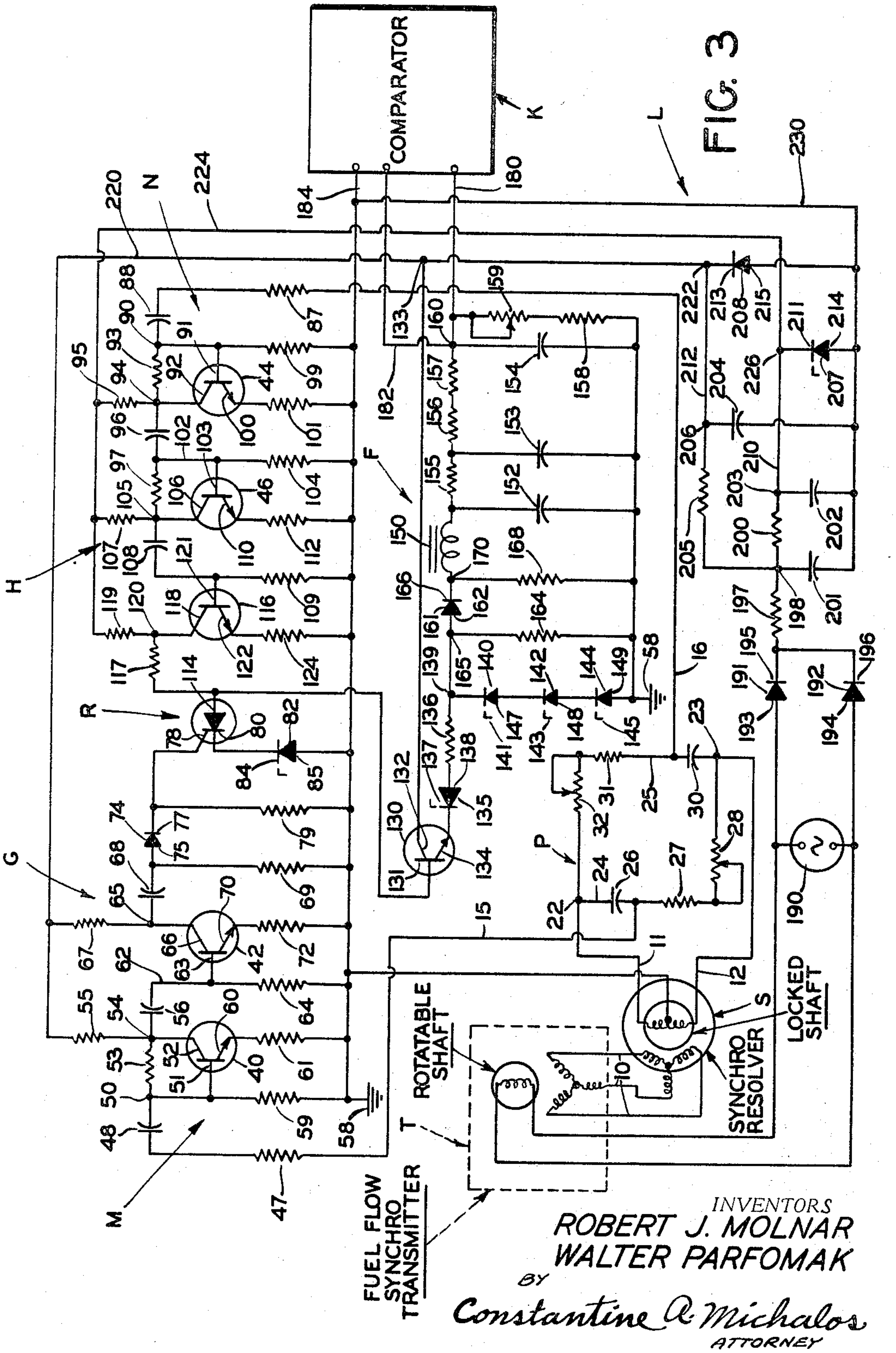
FIGURE 3 is a circuit diagram of the invention in accordance with the embodiment shown in FIGURE 1.

As illustrated in detail in FIGURE 3, locked shaft synchro resolver S receives signals from the fuel flow transmitter T through conductors 10 and provides two sine waves. One sine wave is directed through the conductor 11 to a point 22 of the phase shift bridge P and the other sine wave is directed through the conductor 12 to a point 23 of said phase shift bridge P. Connecting points 22 and 23 of the phase shift bridge P are line conductors 24 and 25. Line conductor 24 contains therein a capacitor 26, a load resistor 27, and a variable resistor 28. The line conductor 25 contains therein a capacitor 30, a load resistor 31, and a variable resistor 32.

Interposed between the capacitor 26 and the resistor 27 is the line conductor 15 and interposed between the capacitor 30 and the resistor 31 is the other line conductor 16. The line conductors 15 and 16 connect the phase shift bridge P to the amplifiers M and N, respectively. As can be seen from FIGURE 3, each amplifier M and N comprise a pair of transistors such as transistors 40 and 42 of amplifier M and transistors 44 and 46 of amplifier N.

The line 15, connecting amplifier M to the phase shift bridge P, includes a load resistor 47 and a line capacitor 48, which connects at a junction 50 to a base terminal 51 of the transistor 40 and to its collector terminal 52 through a resistor 53. Interposed between the collector terminal 52 and the resistor 53 at junction 54 is a resistor 55 and a capacitor 56. Connecting the base terminal 51 of transistor 40 to a ground 58 is a load resistor 59, and connecting an emitter terminal 60 of the transistor 40 to the ground 58 is a load resistor 61.

A line conductor 62 connects a base terminal 63 of the transistor 42 to the capacitor 56 and to the ground 58 through a resistor 64. Connecting a collector terminal 66 of the transistor 42 at the junction 65 is the differentiator G consisting of a resistor 67, a capacitor 68, and a resistor 69. Connecting an emitter terminal 70 of the transmitter 42 to ground 58 is a load resistor 72.

Referring again to FIGURE 1, it can be seen that the sine wave A from the line conductor 15 of the phase shift bridge P is fed into the amplifier M. The amplifier M converts the sine wave A into a square wave form. This square wave is then differentiated by the differentiator G yielding both positive and negative pulses. Since only the positive pulses can be used by the silicon controlled rectifier switch R, a diode 74 is used to block the negative pulses. The diode 74 has an anode lead 75 connected to the capacitor 68 and to ground 58 through the resistor 69 and a cathode lead 77 connected to a gate terminal 78 of the silicon controlled rectifier switch R and to the ground 58 through a load resistor 79. A cathode terminal 80 of the silicon controlled rectifier switch R is connected to the ground 58 through a Zener diode 82. The cathode terminal 80 of the silicon controlled rectifier switch R is connected to the cathode lead 84 of the Zener diode 82 and an anode lead 85 of the Zener diode 82 is connected to ground 58.

Therefore, whenever a positive pulse does appear through the amplifier M, differentiator G, and diode 74, it will turn on the silicon controlled rectifier switch R. Since silicon controlled rectifiers possess an inherent latching characteristic, the silicon controlled rectifier switch R will remain on until it is turned off by either removing its anode voltage or by reducing its anode current below a critical value. In this invention, the turn off pulse is obtained by the other amplifier N, as herein more fully described.

The line 16, connecting amplifier N to the phase shift bridge P, includes a load resistor 87 and a line capacitor 88, which connects at a junction 90 to a base terminal 91 of the transistor 44 and to a collector terminal 92 through a resistor 93. Interposed between the collector terminal 92 and the resistor 93 at junction 94 is a resistor 95 and a capacitor 96. Connecting the base terminal 91 of the transistor 44 to ground 58 is a load resistor 99 and connecting emitter terminal 100 of the transistor 44 to the ground 58 is a load resistor 101.

A line conductor 102 connects a base terminal 103 of the transistor 46 to the capacitor 96, to a resistor 97, and to the ground 58 through a load resistor 104. Connecting a collector terminal 106 of the transistor 46 at a junction 105 is the resistor 97 and the differentiator H consisting of a resistor 107, a capacitor 108, and a resistor 109. Connecting an emitter terminal 110 of the transistor 46 to ground 58 is a load resistor 112.

Referring again to FIGURE 1, it can be seen that the sine pulse B from the phase shift bridge P, directed through the line conductor 16, is fed into the amplifier N. The amplifier N converts the sine wave B into a square wave. This square wave is then differentiated by the differentiator H yielding both positive and negative pulses.

There is further provided, as shown in detail in FIGURE 3, a switching transistor 116 interposed between the differentiator H and the silicon controlled rectifier switch R. Connecting the silicon controlled rectifier switch R at its anode terminal 114 through a resistor 117 is a collector terminal 118 of the switching transistor 116, and a resistor 119 at a junction 120. The switching transistor 116 is also connected to the capacitor 108 of the differentiator H by its base terminal 121 and to ground 58 through the resistor 109. An emitter terminal 122 of the switching transistor 116 is connected to the ground 58 through a resistor 124.

The switching transistor 116 shorts out the voltage to the silicon controlled rectifier switch R below the critical voltage of the zener diode 82 to stop the conduction through the silicon controlled rectifier switch R, until a positive pulse is directed again from the amplifier M and differentiator G to the silicon controlled rectifier switch R.

The silicon controlled rectifier switch R is turned on by the pulse from amplifier M and differentiator G is turned off by the pulse from amplifier N and differentiator H, to produce an output direct current voltage proportional to the shaft rotation of the fuel flow transmitter T.

In order that any loading effect is eliminated by the filter F used in the converter circuit, upon the switching circuit just described, a buffer or isolating transistor 130 is used. The isolating transistor is connected to the circuitry in the following manner: Its base terminal 131 is connected to the anode terminal 114 of the silicon controlled rectifier switch R and to the resistor 117; its collector terminal 132 is connected at a junction 133 to the amplifier M and to the differentiator G through resistors 55 and 67 and to a regulated direct current power unit L as hereinafter more fully described; and, its emitter terminal 134 is connected to the filter F, through a zener diode 135 and a resistor 136. The emitter terminal 134 of the transistor 130 connects a cathode 137 of the zener diode 135, and the resistor 136 connects an anode 138 of the zener diode 135.

The filter F, connecting the silicon controlled rectifier R through the zener diode 135 and the switching transistor 130 at a junction 139, comprises a plurality of zener diodes 140, 142, and 144. The zener diodes 140, 142, and 144 are connected in series with their cathodes 141, 143, and 145, respectively, connecting the resistor 136 and their anodes 147, 148, and 149 connecting the ground 58.

In addition, the filter F comprises a choke 150 and three resistor-capacitor stages comprising capacitors 152, 153, and 154, and resistors 155, 156, and 157 with a resistor 158 and a variable resistor 159 connected to ground 58 and to the resistor 157 and the capacitor 154 at a junction 160. In this manner, a rapid response may be obtained when there is a linear output. The filter also is provided with a diode 161 having its anode 162 connecting the resistor 136 and the cathode 141 of the zener diode 140 at the junction 139 and connecting the ground 58 through a resistor 164 at a junction 165. The diode 161 also has a cathode 166 connecting the ground 58 through a resistor 168 and connecting the choke 150 at a junction 170. In turn, the filter at junction 160 is connected to the comparator K, which is more fully described in the aforementioned copending U.S. application Ser. No. 535,745, through line conductors 180 and 182. The comparator K also is connected to the ground 58 through a line conductor 184 for the proper operation of the system.

It should be also noted that the system operates through a regulated direct current power unit L generally comprising an alternating current power suorce 190 directed through a pair of diodes 191 and 192 having their anodes 193 and 194 respectively connected to the alternating current source and their cathodes 195 and 196 respectively connected through a resistor 197 to the control or regulating section of the power unit L at junction 198. The two diodes 191 and 192 are used for applying both negative and positive voltages of the power source 190 to the system.

The direct current power unit L also comprises the regulating section which includes a resistor 200 interposed between capacitors 201 and 202 connected at junction 198 and at a junction 203. In addition, there is provided another capacitor 204 connected through a resistor 205 to the resistor 197, the resistor 200, and the capacitor 201 at the junction 198. In addition, the direct current power unit comprises a zener diode 207 and a diode 208. A line conductor 210 connects the resistor 200 and the capacitor 202, at the junction 203, to a cathode 211 of the zener diode 207 and a line conductor 212 connects the resistor 205 and the capacitor 204 to a cathode 213 of the diode 208 at the junction 206. The capacitors 201, 202, and 204, an anode 214 of the zener diode 207 and an anode 215 of the diode 208 are connected to the ground 58 through the line conductors 184 and 230.

A line conductor 220 connects the regulated direct current power unit L at junction 222 to the amplifier M through the resistors 55 and 67. The line conductor 220 also connects the power unit L at junction 222 to the isolating transistor 130 at junction 133. An additional line conductor 224 connects the power unit L at junction 226 to the switching transistor 116 through resistor 119 and to the silicon controlled rectifier switch R through resistor 117. The line conductor 224 also connects the power unit L at junction 226 to the amplifier N through resistors 95 and 107. Further, a line conductor 230 connects the capacitors 201, 202, and 204, and the anode 214 of the zener diode 207 and the anode 215 of the diode 208 through line conductor 184 to ground 58.

In the operation of the system, a mechanical shaft angle of the fuel flow transmitter T can be measured by the alternating current to direct current converter circuitry herein-described by transforming the alternating current signals into a usable direct current signal to be directed through the comparator K and through the overall solid state display as more fully described in the aforementioned copending U.S. application Ser. No. 535,745. It should be noted that the solid state system described in the copending U.S. application Ser. No. 535,745 necessitates the use of a direct current signal for its operation. This invention should not be limited to this specific use, but this circuitry can be used in any other system which necessitates the conversion of the alternating current to direct current signals.

Since the fuel flow transmitter produces an alternating current, the alternating current must be converted into a proportional analog direct current signal. All of these signals are adjustable in the converter to provide stabilized accuracy.

The means of converting the alternating current signal from the synchro to direct current is as follows: Fuel flow synchro signals are fed from the fuel flow transmitter T to the locked shaft three phase-two phase synchro S to provide two alternating current signals. The resultant resolver or sine wave signals are then put through the phase shift bridge P which produces the two sine wave signals A and B with a phase difference directly proportional to the input parameter of the fuel flow transmitter T. These two sine wave signals A and B are then fed into the amplifiers M and N.

The sine wave A from one portion of the phase shift bridge P is fed into the amplifier M through the line conductor 15 to transistors 40 and 42, which converts the wave form into a square wave. In conjunction with the regulated direct current supply from the power unit L, this square wave is then differentiated by the differentiator G through its components, resistor 67, capacitor 68, and resistor 69, which yields both positive and negative pulses. Since only the positive pulses are being used to turn on the silicon controlled rectifier switch R, the diode 74 blocks the negative pulses. When a positive pulse C does appear, it will turn on the silicon controlled rectifier switch R. Since the silicon controlled rectifier switch R possesses an inherent latching characteristic, it will remain on until it is turned off by either removing the voltage at its anode 114 or reduces its anode current below a critical value.

The turn off pulse is obtained from the amplifier N which comprises the transistors 44 and 46. The wave is then differentiated by the differentiator H comprising the resistor 107, capacitor 108, and resistor 109. Since the pulse height must remain constant for the proper operation of the system, the temperature compensating zener reference diodes 140, 142, and 144 are used at the input of the filter F. The actual filtering is accomplished by the choke 150 and the three resistor capacitor stages as hereinbefore described. In this manner, a rapid response with linear output is obtained. This method is independent of the synchro characteristic but can be computed for line frequency change unless a converter supplies precise signal supply to the fuel flow transmitter T.

More specifically, as shown by the flow diagram of FIGURE 1 and the graphical representation of FIGURE 2, when the shaft of the fuel flow transistor T is turned due to a measured parameter, the phase shift between the voltages or sine waves A and B is varied. Since the wave shapes of these voltages are sinusoidal, they must be converted to square waves by means of the amplifiers M and N, and fed into the differentiating circuits G and H, which produce the turn-on pulse at C and the turn-off pulse at D in the silicon controlled rectifier switch R. The time separation of these pulses then determines the pulse width output of the silicon controlled switch R. Since this pulse width varies with the transmitter shaft rotation, the direct current content of the pulse varies linearly with the shaft angle of the transmitter T. Finally, the direct current portion of the pulse is extracted by means of the filter F.

In summary, the amplifiers and differentiators transform the sinusoidal input into a square wave which has a fast rise time because of its double amplification. This square wave presented by the differentiators and pulse shaping allows a pulse having a fixed amplitude and width. It should be understood that when the input frequency is varied, the pulse repetition rate varies and therefore the direct current output voltage is also varied. This direct current output may then be used in a circuitry such as provided in the comparator circuitry K more specifically described in the afore-mentioned copending U.S. application Ser. No. 535,745, and U.S. application Ser. No. 386,996, filed Aug. 3, 1964, by Robert J. Molnar et al. and assigned to The Bendix Corporation, the same assignee as the present application.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

We claim:

1. A circuit of the kind described comprising transducer means for producing alternating current signals representing a measured parameter, a phase shift bridge responsive to said signals for producing two outputs which vary in phase in accordance with the signals, said phase shift bridge including two legs each containing a resistor and a capacitor, and pulse shaping means operatively connected to each of said legs between the resistor and the capacitor and responsive to the outputs from said phase shift bridge, and switch means connected to the pulse shaping means and rendered conducting by one phase output and non-conducting by the other phase output to provide output pulses which vary in width in accordance with the signals.

2. The circuit of claim 1 wherein said switch means is a silicon controlled rectifier having a gating terminal, an anode and a cathode and the pulse shaping circuit includes an amplifier interposed between the gating terminal of said silicon controlled rectifier and the one leg of the phase shift bridge between the resistor and the capacitor of said leg for rendering said silicon controlled rectifier conducting and a second amplifier interposed between the anode of said silicon controlled rectifier and the other leg of said phase shift bridge between the capacitor and the resistor of said other leg for rendering said silicon controlled rectifier non-conducting.

3. A circuit as defined in claim 1 in which the pulse shaping circuit further includes a differentiating means connected between the amplifiers and the silicon controlled rectifier.

4. An electronic converter for converting alternating current synchro signals into direct current signals, comprising a rotatable shaft synchro transmitter for providing alternating current synchro signals corresponding to transmitter shaft positions, a locked shaft resolver connected to said transmitter, a phase shift bridge connected to the resolver for producing two sine waves whose phase angles vary in accordance with the angular position of the transmitter shaft, a first amplifier for producing a square wave from said first sine wave at one phase angle, and a second amplifier for producing a square wave from the second sine wave at a second phase angle, the phase difference between said square waves being directly proportional to the angular shaft position of said transmitter, and switching means connected to said amplifiers and responsive to said square waves and rendered conducting by one and non-conducting by the other for producing output pulses which vary in width linearly with the angular position of the shaft of said transmitter.

5. The structure of claim 4 further comprising filter means for converting the output pulses into a direct current voltage and means connected to the filter means and controlled by said output direct current voltage.

6. A synchro to direct current converter comprising an electronic converter for converting alternating current synchro signals into a direct current, comprising a synchro transmitter having a shaft angularly adjustable in response to a predetermined measured parameter and providing alternating current signals, a locked shaft resolver electrically connected to said transmitter, a phase shift bridge connected to said locked shaft resolver for producing two sine waves phase separated in accordance with the parameter, a first amplifier connected to said locked shaft resolver for producing a square wave from the first sine wave at said one phase angle and a second amplifier connected to said locked shaft synchro for producing a square wave from the second sine wave at said second phase angle, the phase difference between the phase angles of the square waves being directly proportional to the input measured parameter, switching means connected to said amplifiers and rendered conducting in response to one of said square waves and non-conducting in response to the other square wave for producing output pulses which vary in width linearly with the measured parameter, filter means for converting the output pulses into a direct current voltage corresponding to the parameter and means connected to said filter means and controlled by the output direct current voltage.

7. The structure of claim 6 wherein a series connected resistor and diode precede said filter means for linearizing the direct current output pulses.

8. A circuit of the kind described comprising a transmitter for providing alternating current signals, a locked shaft resolver connected to said transmitter, phase shift bridge means connected to said resolver and providing two sine waves phase separated in accordance with the alternating current signals, pulse shaping means connected to said phase shift bridge means for producing first and second pulses time separated in accordance with the phase separation of the sine waves, and a switching means connected to said pulse producing means and responsive to the first and second pulses for rendering said switching means conducting in the intervals between the first and second pulses to provide pulses which vary in accordance with the alternating current signals.

9. An electronic converter comprising transducer means for producing alternating current signals representing a measured parameter, means connected to the transducer means for providing alternating current signals phase separated in accordance with the amplitudes of the signals, means responsive to said phase separated alternating current signals and providing squared waves corresponding thereto, differentiators connected to said last mentioned means for producing pulses corresponding to the phase separation of the alternating current signals, and a silicon controlled rectifier connected to said differentiators and rendered conducting in the interval between the pulses to provide output pulses which vary in accordance with the measured parameter.

10. An alternating current to direct current converter comprising a signal transmitter for providing sinusoidal signals corresponding to a measured parameter, a resolver having a locked shaft and receiving said sinusoidal signals, a phase shift bridge connected to said locked shaft resolver and having a first resistor and capacitor in one leg portion and a second resistor and capacitor in another leg portion and providing phase displaced signals corresponding to the sinusoidal signals, a first amplifier connected to the first resistor and capacitor and a second amplifier connected to the second resistor and capacitor for amplifying the phase displaced signals, a first differentiator connected to the first amplifier and providing first driving pulses, a second differentiator connected to said second amplifier and providing second driving pulses time separated from the first pulses in accordance with the phase displacements of the signals, and a silicon controlled rectifier connected to said differentiators and responsive to said first and second pulses for rendering said silicon controlled rectifier conducting in the intervals between the first and second pulses to provide a pulse corresponding in width to the measured parameter.

11. The structure of claim 10 further comprising filter means connected to the silicon controlled rectifier for converting the last mentioned pulses to a linear direct current output corresponding to the measured parameter.

12. The structure of claim 11 including buffer means interposed between said filter means and said silicon controlled rectifier.

13. A converter comprising transducer means for producing alternating current signals representing a measured parameter, means connected to said transducer means for providing two alternating current signals phase separated in accordance with the signals, pulse shaping means responsive to the phase separated alternating current signals for producing pulses time separated in accordance with the phase separation of the alternating current signals, switching means connected to said pulse producing means and responsive to said pulses and providing pulse outputs having durations corresponding to the intervals between the pulses, and output means connected to the switching means and responsive to the pulse outputs and providing a direct current ouput which varies linearly with the alternating current signals.

14. A converter as defined in claim 13 in which the switching means includes a silicon controlled rectifier rendered conducting by one pulse and rendered non-conducting by the time separated pulse.

15. A converter as defined in claim 14 in which the output means includes a buffer circuit connected to the silicon controlled rectifier for eliminating load effects on the silicon controlled rectifier.

16. A converter as defined in claim 13 in which the pulse shaping means includes amplifier means for amplifying and squaring the phase separated alternating current signals, and differentiator means connected to the amplifier means and converting the squared amplified signals to pulses.

17. A converter as defined in claim 13 in which the means providing a direct current output includes filter means.

18. A converter as defined in claim 17 in which the means providing a direct current output includes stabilization means between the switching means and filter means.

19. A converter as defined in claim 18 in which the stabilization means comprises a plurality of zener diodes.

References Cited

UNITED STATES PATENTS 2,966,300 12/1960 Dickinson ---------- 340—198

THOMAS B. HABECKER, *Primary Examiner.*

NEIL C. READ, *Examiner.*